Nov. 8, 1966 W. W. DAVIS 3,284,783

MAGNETIC RECORDING ON A THIN-FILM SURFACE

Filed July 10, 1961

INVENTOR
WILLIAM W. DAVIS

BY Marvin Jacobson
AGENT 3,284,783

MAGNETIC RECORDING ON A THIN-FILM SURFACE

William W. Davis, Minneapolis, Minn., assignor to Sperry Rand Corporation, New York, N.Y., a corporation of Delaware Filed July 10, 1961, Ser. No. 122,799
16 Claims. (Cl. 340—174)

This invention relates to memory apparatus and more particularly to apparatus for storing digital data on a magnetizable recording surface.

Apparatus for storing information has found extensive use in the present day electronic field. This is especially true in digital computers which utilize a variety of recording and storage systems with principal emphasis on magnetic recording. Examples of commonly used storage systems are the well-known coincident current random access memory which utilizes a plurality of ring-like magnetic cores, with each of the cores able to store a magnetic representation of a single digit of information. This particular type of memory has been described in the article by Jay W. Forrester in the Journal of Applied Physics, January 1951, page 44, entitled "Digital Information Storage in Three Dimensions Using Magnetic Cores." Another well-known type of magnetic storage utilizes a moving magnetizable surface for mass storage of digital information. A drum or a tape having a surface coated thereon of a magnetizable material is transported past a transducing device and as the digits to be stored are fed serially into the transducing element in the form of electrical signals, the transducing element develops a magnetic field corresponding to the value of the digits and this magnetic field affects the magnetic state of discrete areas of the magnetizable surface such that each discrete area thereafter contains a magnetic representation of the digit value. Patent No. 2,540,654 on "Data Storage Systems" issued to Cohen et al. describes the operation of a magnetic drum storage system. More recently magnetic thin-film elements have been utilized in memory systems for digital devices. It is understood that hereinafter any reference to a magnetic thin-film is restricted to a magnetizable material having single domain thickness properties. The magnetic thin-films referred to throughout the instant application are preferably of a type prepared in the manner described in Patent 2,900,282 issued to Sidney M. Rubens, although no limitation thereto is intended. Copending application by Sidney M. Rubens et al. on "Magnetic Apparatus and Methods," Serial No. 626,945, filed December 7, 1956, now Patent 3,030,612, and assigned to the same assignee of the instant application, describes in detail the operation of thin-film elements as storage devices. The magnetic thin-film material is characterized by having an easy direction or axis of magnetization in the plane of the film. With no external magnetic field applied, the magnetization vector of the film element is aligned in said easy direction and is stably located in one of two different directions 180° apart. In this way the thin-film element has two stable states and, therefore, can be utilized for storing magnetic representations of binary data signals. In order to store a magnetic representation of a binary data signal, a drive line, such as a printed circuit conductor, is inductively coupled to the thin-film element with the magnetic axis of the conductor parallel to the easy axis of the thin-film element. Energy, usually in the form of a pulse of current, is transmitted by the drive line in one of two polarities corresponding to the value of the binary digit to be stored. The magnetic field generated by the current pulse, being coupled to the thin-film element, will, if of great enough magnitude, by what is commonly referred to as wall motion cause the thin-film magnetic vector to be aligned along the easy axis thereof in a direction corresponding to the direction of the applied magnetic field, thereby storing a magnetic representation of the binary signal. Additionally, as described in the Rubens et al. application, supra, storage can be effected even though the magnetic field generated by the drive line is not of itself large enough to cause proper alignment of the thin-film magnetic vector. This is achieved by applying another magnetic field in the plane of the thin-film element to condition it to store a magnetic representation of the binary data signal. This conditioning field is applied transverse to the easy direction concurrently at least in part with the binary data signal which is inductively coupled from the drive line. The combined transverse field and drive line field, the latter being parallel to the easy axis of magnetization and, therefore, referred to as the longitudinal field, cause the magnetization vector to rotate in the plane of the thin-film element so that upon removal of the magnetic field therefrom it will be aligned on the easy axis in a direction corresponding to the field inductively coupled from the drive line, which corresponds to the binary data signal. A thin-film element is required for each of the binary data signals desired to be stored and sense lines are required for subsequent reading out of the stored data.

Some of the disadvantages of the latter described system are the large number of individual elements having substantially identical characteristics which must be manufactured, and the necessity of properly aligning all of the drive and sense lines to each other end to all of the elements. Despite these disadvantages, the advantages of thin-film material including speed of operation, compactness, and low power requirements makes it highly desirable for storage purposes in memory systems.

Other storage systems, such as magnetic drums, discs, and tapes are used for mass storage of large amounts of digital data. As previously described, the data is stored on the surface in discrete areas. The magnetizable material heretofore used in recording on moving surfaces requires comparatively large magnetic fields of comparatively long time durations in order to effect recording of information in a discrete area.

To overcome the disadvantages described above, this invention utilizes a magnetic thin-film surface as the storage medium for a memory system. In addition to the single domain thickness properties and an easy direction of magnetization, as stated above, this thin-film surface is further characterized by locally magnetically-saturable areas which are contiguous in the surface throughout the surface. Each of these local areas are able to respond to magnetic fields applied thereto in the same manner as the individual thin-film elements described above. In other words, each local area has a magnetization vector which can be aligned parallel to the easy axis in a direction corresponding to a magnetic field applied thereto so as to store a binary digit. The local areas cannot be strictly defined in terms of distances since the extent of any given area is dependent upon the type of magnetizing signal applied thereto. For example, even an individual thin-film element in the order of .020 to .030 inch in diameter can be considered as comprising a plurality of locally magnetically saturable areas since if the proper type of magnetizing signal were applied thereto in a manner as described below, it would constitute a surface area storing magnetic representations of a plurality of data signals.

In one embodiment of this invention a conducting means, such as a printed circuit conductor, commonly referred to as the digit drive line, is inductively coupled to the magnetic surface and is fixedly located in space relative to said surface. The drive line has transmission line characteristics so that energy in the form of current pulses fed into one end of the drive line will be propagated by the drive line to the terminating end, the propagation speed being dependent upon the velocity of propagation of the drive line. Digital information, in this instance binary digits, in the form of current pulses are serially applied to the receiving end of the drive line and are propagated toward the terminating end. The drive line further is located with respect to the surface such that the magnetic axis of the drive line is parallel to the easy axis of magnetization of the surface. As the serialized pulses are propagated down the drive line, they appear as a spatially-varying function with respect to the surface. The magnetic field generated by the current pulses on the drive line, being inductively coupled to the surface, provide longitudinal fields to respective locally magnetically-saturable areas in the surface. The drive line magnetic fields applied to the surface are insufficient in themselves to cause the magnetization vectors of said local areas to be stably positioned according to the binary digit value. At a time when the digits to be stored exist on the drive line to produce magnetic fields inductively coupled to the surface, a conditioning magnetic field is applied to the surface in the plane of the surface and transverse to the easy axis of magnetization. The combination of the transverse field and the longitudinal fields causes the magnetization vector of respective local areas in the surface to rotate to a position so that upon removal of the transverse field the vector is aligned parallel to the easy axis and in a direction corresponding to the longitudinal field applied from the drive line. In this manner the serialized data pulses are stored in the thin-film surface in their same serialized relationship. In order to subsequently readout the stored information, a transverse magnetic field may be subsequently applied to the surface causing the vectors of magnetization of each of the local areas to rotate thereby inducing corresponding output signals in the inductively coupled drive line. These output signals will propagate down the drive line toward the terminating end and will appear at the terminating end in the same serialized relationship as they had been entered into and stored on the surface. A sensing circuit at the terminating end is then able to read the information in this serialized relationship.

In another embodiment of this invention the thin-film surface with the characteristics described above is movably located with respect to the drive line while inductively coupled thereto so that the drive line and the thin-film surface have the same relative relationships as exist in the commonly used magnetic-drum or magnetic-tape recording systems. The drive line is inductively coupled to the moving surface with its magnetic axis parallel to the easy direction of magnetization of the thin-film surface. Means for providing a transverse magnetic field is also coupled to the moving magnetizable surface. The binary data to be stored, as received serially by the drive line and in the form of current pulses of polarity corresponding to the binary digit value, generates a longitudinal magnetic field. The field combined with the conditioning transverse field rotates the magnetization vector of the local area of the surface which is instantly inductively coupled to the drive line such that upon removal of the transverse field the vector will be aligned along the easy axis in a direction corresponding to the valve of the binary data signal applied. Because of the fast response of the magnetization vector of each of the local areas to the combined longitudinal field and the conditioning field, magnetic storage of short duration pulses is effected. Additionally, only relatively small magnitude magnetic fields are required.

Therefore, it is on object of this invention to provide an improved digital data storage system.

It is a further object of this invention to provide a large capacity storage system utilizing a moving magnetizable surface for storage.

Still another object of this invention is to provide a storage system operable at very high recording speeds.

Yet another object of this invention is to provide means for recording pulses of extremely short duration.

Another object of this invention is to provide a magnetic memory system in which low magnitude magnetic fields are required.

Still another object object of this invention is to provide a digital data storage apparatus in which the storage or recording is done in a nonmoving recording surface.

Yet another object of this invention is to provide a thin-film magnetic memory system wherein serial information is stored in a parallel mode and parallel readout develops serialized information.

These and other more detailed and specific objects and features will be disclosed in the course of the following specification, reference being had to the accompanying drawing, in which.

Figure 1:
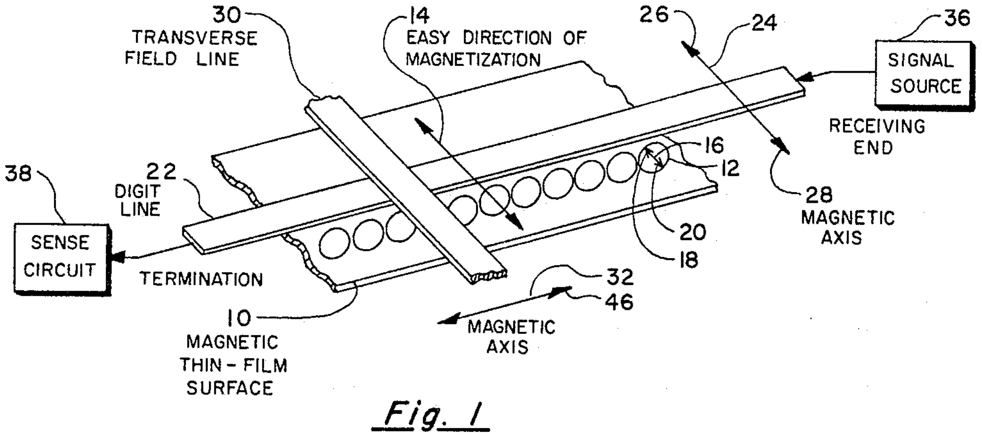
FIG. 1 is an isometric view of one embodiment of this invention.

In FIG. 1 there is shown a magnetic thin-film 10. Although the thin-film is shown in the figure to have an appreciable thickness, as previously stated it actually exhibits single domain thickness properties and is preferably mounted on a suitable substrate for maintaining rigidity. As described in the Rubens et al. application, supra, because of the single domain properties, any change in the magnetization vector is restricted to the plane of the film. When the magnetic thin-film surface is prepared in a manner as described in the Rubens patent, supra, the thin-film is further characterized by having a single easy direction or axis of magnetization with the magnetization vector aligned with said easy axis in one of two possible directions 180° apart. The magnetization vector is rotatable in the plane of the film when subjected to an external magnetic field applied in a proper manner. When prepared as a single sheet or surface of material as distinguished from a plurality of individual elements, the magnetic thin-film surface is further characterized by a multiplicity of contiguous locally magnetically-saturable areas throughout the surface. To aid in describing the operation of the embodiment of this invention, these local areas are represented in FIG. 1 as individual circular elements 12 although actually they are more likely to be in the form of rectangular areas. Each of the circular elements can be considered to include a discrete area of the magnetic thin-film surface and each has an easy axis and a rotatable magnetization vector. The easy axis of magnetization of each of the locally magnetically-saturable areas is parallel to the easy axis 14 of the magnetic thin-film surface. Although the easy axis 16 of only one of the locally magnetically-saturable areas is shown in the figure, it is understood that all of said local areas have an easy axis. For explanatory reasons only, the magnetization vector along easy axis 16 of one of the local areas in the direction shown by arrowhead 18 is arbitrarily designated as being the direction storing the magnetic representation of a "1" and in the direction of arrowhead 20 as storing the magnetic representation of a "0."

Digit line 22 is a conductor preferably of the printed circuit type which is preferably electrically insulated from the magnetic thin-film 10 but is inductively coupled thereto. The magnetic axis 24 of the digit line is parallel to the magnetic thin-film surface easy axis 14 so current flowing through the digit line 22 will produce a longitudinal magnetic field in the plane of the thin-film. Depending on the polarity of the current that is flowing through the digit line, the magnetic field developed thereby will appear in the plane of the thin-film surface in a direction represented by one of the two arrowheads on the magnetic axis 24. For explanatory purposes only, a positive current can be considered as a "1" and will generate a magnetic field in the direction of arrowhead 26, while a negative current represents a binary "0" generating a magnetic field in the direction of arrowhead 28. Transverse field line 30 which is also a conductor preferably of the printed circuit type is electrically insulated from digit line 22 and the magnetic thin-film surface and is also inductively coupled to the magnetic thin-film surface. Although in the figures the transverse field line 30 is shown to be a single line of approximately the same width as the digit line 22, no limitation thereto is intended. The means for providing a transverse field could comprise a plurality of parallel lines commonly connected to a current source, or a single wide line since it is only required that the transverse field be applied concurrently throughout the area of the thin-film surface upon which data is to be stored. A current pulse applied to conductor 30 develops a conditioning magnetic field which appears in the surface of the magnetic thin-film in a direction represented by conditioning field magnetic axis 32. In the embodiment shown in FIG. 1 conductor 30 is at right angles to digit line 22 and, therefore, the magnetic field produced by the current on conductor 30 will be transverse to the easy axis of the magnetic thin-film surface. It should be understood that the entire magnetic field produced by a current pulse on conductor 30 need not be transverse as long as a required portion thereof is in that direction. The only requirement, as will be explained further in more detail, is that the transverse field developed by current through conductor 30 and applied to the surface is sufficient to condition the magnetic thin-film to store magnetic representations of the digit signals which are applied to digit line 22. FIG. 1 further includes a signal source 36 which is coupled to digit line 22 at the receiving end thereof and a sense circuit 38 which is coupled to the digit line at the termination end. The signal source 36 generates serialized binary data signals in the form of current pulses which are propagated by the digit line 22 from the receiving end toward the termination end. As will be subsequently described in more detail, sense circuit 38 detects the signals received at the termination end of the digit line when the information which is stored in the magnetic thin-film surface is readout.

Figure 2:
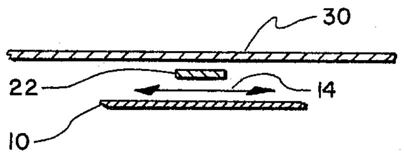
FIG. 2 is an end view of the embodiment shown in FIG. 1.

FIG. 2 shows an end view of the arrangement of the magnetic thin-film surface 10, the digit line 22 and the transverse field line 30, and includes a representation of the easy axis 14 of the magnetic thin-film surface 10.

Figure 3:
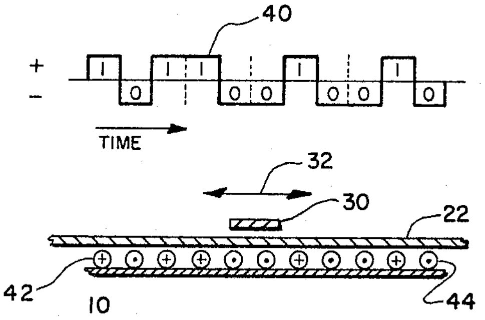
FIG. 3 is a side view of the embodiment shown in FIG. 1 and includes a representative spatially-varying wave-form of signals applied.

FIG. 3 shows, in addition to the side view of the arrangement of the conductors and the magnetic thin-film surface, the magnetic axis of the conductor 30 as represented by vector 32. There is further shown in FIG. 3 an exemplary wave form of serialized binary data which is generated by the signal source 36 and propagated by the digit drive line 22 from the receiving end toward the termination end. The data is in pulse form with a positive pulse representing a binary "1" and a negative pulse representing a binary "0." Considering time increasing from left to right, the sequential order of the binary data is such as to produce the binary number or word 10110010010. Since the binary value of each bit of the data is represented by the polarity of the signal pulse applied to the digit line, the direction of the magnetic H-vector resulting from each of the binary data pulses will be in a direction corresponding to the respective bit values. The H-vectors corresponding to each of the bit values are represented in FIG. 3 by conventional symbols. Corresponding to the leftmost bit of the serialized binary word, which is a "1," and vertically aligned therewith in FIG. 3 is an end view of H-vector 42 showing a direction into the paper which corresponds to the direction of arrowhead 26 in FIG. 1. The rightmost binary digit being a "0" has its corresponding H-vector 44 in the direction of arrowhead 28 of FIG. 1. Each of the remaining bits of the serialized binary data has a corresponding H-vector representation shown in FIG. 3 with the direction corresponding to the value of the respective binary digits. The H-vectors are all parallel to the easy axis of the magnetic thin-film surface and are, therefore, parallel to the easy axis of each of the locally magnetically-saturable areas and provide longitudinal magnetic fields.

Assume all of the locally magnetically saturable areas 12 have their magnetization vectors aligned along their easy axes 16 in the direction of arrowhead 20, so that they may be considered to be storing the magnetic representation of a "0." A signal in the form of a positive going current pulse generated by the signal source 36 when received by the digit line 22 at the receiving end will propagate down the digit line toward the termination end. The digit line has the well-known transmission line characteristics so that the length of time it takes the pulse to propagate from the receiving end to the termination will be dependent upon the velocity of propagation of the digit line. With the digit line having a velocity of propagation equal to $v$ and the time duration of the applied pulse or pulse width of said pulse being equal to T, the pulse will traverse a section of the digit line X equal to $Tv$. As the pulse propagates down the digit line it occurs, in relationship to the magnetic thin-film surface which is inductively coupled to the digit line, as a spatially-varying function. The magnetic H-vector representing the magnetic field generated by the current pulse continues down the line with the current pulse and, being a positive going pulse, has a direction as shown by arrowhead 26 representing a binary "1." The magnetic field H-vector of the positive pulse being in a direction opposite to that of the magnetization vectors of the locally magnetically-saturable areas has the tendency to reverse the magnetic state of each of the local areas as it propagates down the digit line. As described in more detail in the Rubens et al. application, supra, unless the magnetic field applied to the magnetic thin-film surface is of great enough magnitude to reverse or switch the magnetic state of the thin-film by wall motion, there will be no reversal of the magnetic state until the switching threshold is reduced. In this embodiment the magnetic fields produced by the pulses representing the binary digit values are not of themselves great enough to cause switching of the locally magnetically-saturable areas.

While the positive pulse is propagated down the digit drive line with its magnetic field coupled to the magnetic thin-film surface, a current pulse is applied from a source, not shown, to transverse field line 30. The magnetic field developed by the current pulse on conductor 30, which is orthogonal to the digit line 22 and is lengthwise parallel to the thin-film easy axis, provides a transverse magnetic field in the plane of the magnetic thin-film surface. The polarity of the current pulse applied to conductor 30 is immaterial since the effect of the transverse magnetic field will be the same regardless of the direction of the magnetic field from the current pulse on conductor 30. Assuming the current pulse on conductor 30 produces a magnetic field in the direction of arrowhead 46, it conditions the magnetic thin-film to store a magnetic representation of the digit line signal by causing the magnetization vectors 16 of all of the locally magnetically-saturable areas, which are originally in the "0" state as represented by arrowhead 20, to rotate away from the easy axis in a counter-clockwise direction. The combination of this conditioning transverse field and the longitudinal field produced by the current pulse on the digit line rotates the magnetization vector of the local area which is at that instant of time affected by this combination of fields, further in the counter-clockwise direction to a position beyond the threshold switching point so that upon cessation of the transverse field, the magnetization vector will align itself along the easy axis in a direction as represented by arrowhead 18, thereby storing a magnetic representation of a binary "1." Since the positive current pulse on the digit line continues its propagation toward the termination end, if the transverse field is applied until the digit pulse reaches the termination end, other local areas of the magnetic thin-film surface will switch magnetic states in the same manner as described above. If it is desired to store the magnetic representation of this binary digit in only a single local area, the transverse field applied via the current pulse on conductor 30 must be of short duration as compared to T.

Expanding the operation of the embodiment of this invention as shown in FIG. 1 to the storage of more than a single binary digit, consider the series of binary digits or bits 40 representing a binary word as shown in FIG. 3 generated by the signal source 36. As shown by the wave form 40, in sequential order the current pulses representing the values of the bits are representative of the binary word 10110010010. The pulses in the wave form shown are propagated through the digit line 22, which has a constant velocity of propagation, so that the bits retain their same relative sequential occurrence timewise during the propagation toward the termination end. Each of the bits has a corresponding magnetic H-vector parallel to the easy axis of magnetization of the magnetic thin-film and in a direction corresponding to arrowhead 26 of FIG. 1 for a binary "1" and in the direction of arrowhead 28 corresponding to a binary "0." As with the single pulse described above, the serialized data of wave form 40 occurs as a spatially-varying function on the digit line with respect to the magnetic thin-film surface 10. The side view of FIG. 1 shown in FIG. 3 includes representations of the H-vectors which correspond to each of the bits in the serialized data of wave form 40 and are shown, for example, by items 42 and 44 representing respectively the H-vector in a direction of arrowhead 26 and in the direction of arrowhead 28 corresponding to the first and last bits of the serialized binary data of wave form 40. For purposes of explanation, since the serialized binary signals represent a binary word of eleven bits the magnetic thin-film surface 10 of FIG. 1 is shown to include eleven locally magnetically-saturable areas as represented by the circles 12. It is understood, of course, that no limitation is intended by these exemplary quantities. As previously explained, the extent of each local area cannot be strictly defined and is determined by the applied signals. As the serialized data of wave form 40 propagates down the digit line 22 toward the termination end, at a given instant of time each of the bits will be aligned with respective ones of the locally magnetically-saturable areas in the magnetic thin-film surface. A current pulse applied to the transverse field line 30 produces a transverse field in the direction shown by arrowhead 46. The combination of the transverse field and the magnetic H-vectors rotates the magnetization vectors of the local areas respectively aligned with the longitudinal H-vectors representing binary "1's" in a clockwise direction to a position beyond the switching threshold, so that upon cessation of the transverse magnetic field, the magnetization vectors will be aligned along the easy axis in a direction corresponding to that of arrowhead 18. Those local areas respectively aligned with the pulses representing binary "0's," will have their magnetization vectors remaining along the easy axis in the direction as shown by arrowhead 20 upon cessation of the transverse field. In this manner magnetic representations of the serialized digital data will be stored in a parallel mode in the respective locally magnetically-saturable areas of the magnetic thin-film surface in the same serialized relationship as the bits were transmitted from the signal source. It should be understood, of course, that although not shown, the digit line which has the transmission line characteristics is terminated in the characteristic impedance of the transmission line, preferably at the input to the sense circuit 38, so that no reflections occur in the digit line.

In order to read out data which has been previously stored in the magnetic thin-film 10, current is applied to transverse field line 30. The transverse magnetic field in the plane of the thin-film surface resulting from the current causes the magnetization vectors of all of the local areas to rotate in the plane of the film away from the easy axis. The magnetization vectors in those areas storing magnetic representation of a binary "1," rotate in a clockwise direction when the applied transverse field is in the direction of arrowhead 46 while the magnetization vectors in those local areas storing magnetic representations of binary "0" rotate in a counter-clockwise direction. The partial rotations of the magnetization vectors produce change in the magnetic field which induces a voltage signal into the digit line 22. Since those areas storing "1's" rotate clockwise and those storing "0's" rotate counter-clockwise, the induced voltage signals differ in polarity or phase thereby retaining respective designations as "0's" or "1's." The single pulse applied to conductor 30 for readout purposes reads the information from all of the localized areas simultaneously and the signals induced by the rotation of the magnetization vectors appear on respective sections of the digit line 22 in the same serialized relationship as stored. These induced signals propagate down the digit line, in the same manner as the propagation described above in relation to the storage of signals and appear at the termination end and at the input to the sense circuit 38 in the same serialized relationship as they had been originally stored. In this manner there is achieved a parallel readout and subsequent transmission in a serial mode.

Preferably readout is performed by the current applied to the transverse field line being in the form of a short duration pulse with the magnitude of the field produced by the pulse being insufficient to demagnetize the thin-film surface. The leading edge of the current pulse generates a magnetic field causing partial rotation of the magnetization vectors of the local areas which rotation in turn induces corresponding signals into the digit line 22 as described above. At the trailing edge of the current pulse the transverse magnetic field collapses allowing the magnetization vectors of the local areas to return to their previous state along the easy axis which again induces corresponding signals in the magnetically coupled digit line. In this manner the readout signals for each of the stored digits is in a doublet or double polarity form and there is achieved nondestructive readout. Other possible ways of reading out the information include destructive readout wherein the transverse field is of such a magnitude to destroy the stored information. Additionally, the current for either destructive or nondestructive readout could be a step function, that is with the current applied at a specified magnitude for a period of time during which the readout signals propagate to the sensing circuit. Readout by the latter method produces signals on the digit line of a single polarity as distinguished from the doublet or double polarity signals when the short time duration pulse is utilized. It should be noted that because of the speed at which the vectors are able to rotate into proper alignment for storage purposes and able to partially rotate during the readout, utilization of magnetic thin-films with the characteristics described provides means for obtaining memory system of the type described. It is because of these high speed characteristics that a short duration transverse field is able to effect storage during propagation of the serialized signals down the digit line and is able to instantaneously readout all of the storage signals and allow them to propagate down the digit line in a serialized fashion for detection and sensing by the sense circuit.

Figure 4:
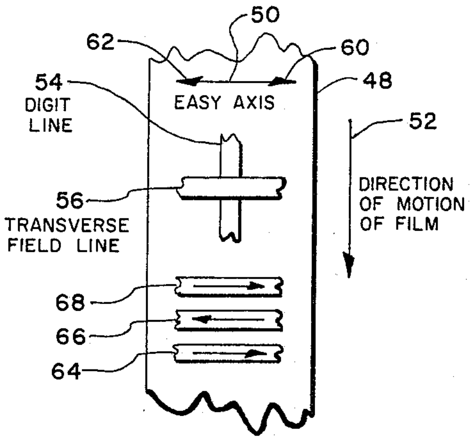
FIG. 4 shows the arrangement of a second embodiment of this invention.
Figure 5:
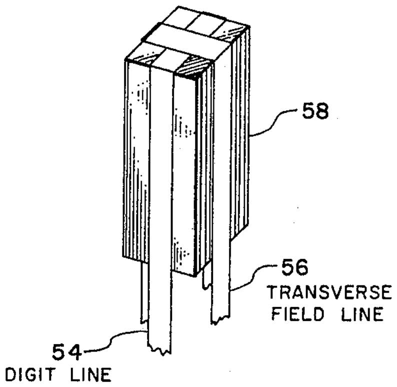
FIG. 5 shows an exemplary means for mounting the drive lines used in a second embodiment.

In the embodiment of this invention shown by FIGS. 1, 2 and 3 the magnetic thin-film, the digit line and the transverse field line are all fixedly mounted with respect to one another and the transmission line effect of the digit line on the serialized data transmitted thereto from the signal source provides the spatially-varying function of the data with respect to the magnetic thin-film surface. In the embodiment represented by FIG. 4 the magnetic thin-film having the identical characteristics to that described above in relation to FIGS. 1 through 3 is in a physical form similar to that of the well-known magnetic tape. The magnetic film having an easy axis of magnetization represented by vector 50 is transported by means, not shown, in a direction as shown by arrow 52 past a fixedly mounted digit line 54 and transverse field line 56, the combination of which serves as a transducer. FIG. 5 shows an exemplary transducer comprising a digit line and a transverse field line, preferably of the printed circuit type, mounted on block 58 so that the transverse field line 56 is parallel to the easy axis of the thin film while the digit line 54 is orthogonal thereto. The two lines are electrically insulated from one another while being inductively coupled to the magnetic thin-film. Pulses of current applied to the digit line provide magnetic fields having magnetic H-vectors parallel to the easy axis of the thin-film and, therefore, provide longitudinal magnetic fields. The magnetic field developed by the transverse field line current is in a direction orthogonal to the easy axis in the plane of the magnetic thin-film surface thereby providing the transverse field. The digit line 54 is coupled to a source, not shown, of serialized binary data signals which generates, in proper sequential order, binary information the value of which is represented by a current pulse of a proper polarity. For purposes of explanation, the polarities can be arbitrarily designated as a positive pulse representing a binary "1" and a negative pulse representing a binary "0" similar to the binary data shown in FIG. 3. As the film is transported past the transducer, the combined magnetic fields from the digit line 54 and the transverse field line 56 rotate the magnetization vectors of each of the locally magnetically-saturable areas in the magnetic thin-film to a position in accordance with the binary digit values on the digit line. Preferably, for each date pulse applied to the digit line there is a current pulse concurrently applied to the transverse field line with the latter pulse bracketed by the former. That is, the leading edge of the transverse field pulse occurs subsequent to the leading edge of the data pulse and the trailing edge of the transverse field pulse occurs prior to the trailing edge of the data pulse. The relative motion between the thin-film and the digit line 54 while the binary data is fed into the digit line in a serial fashion results in the serialized data appearing as a spatially-varying function with respect to the magnetic thin-film. Because each of the local areas is able to respond rapidly to the combined transverse and digit line magnetic fields by rotation of the magnetization vectors thereof, magnetic storage of data represented by short duration pulses is effected. Additionally, less power is required since the magnetization vectors are responsive to low magnitude fields.

The rectangular areas labeled 64, 66 and 68 are shown for descriptive purposes only as representing locally magnetically-saturable areas in the surface of the magnetic thin-film in which binary data has been stored in the same serial relationship as received by the digit line 54. Although for descriptive purposes the local areas are represented by circular areas in FIG. 1, in actual practice the local areas are more generally in the shape of rectangular areas as shown in FIG. 4. Assume that the magnetization vectors of all of the localized areas before being transported past the transducer have been originally positioned in the direction representing a binary "0" which would be in the direction of arrowhead 62. A current pulse applied to transverse field line 56 develops a transverse magnetic field in the plane of the magnetic film 48 which combines with the longitudinal magnetic field from a current pulse representing a binary "1," a positive pulse, on digit line 54 to rotate the magnetization vector of local area 64 as it is being transported past the transducer in a counterclockwise direction so that upon cessation of the transverse field the magnetization vector is aligned along the easy axis but in a direction corresponding to a binary "1" as indicated by arrowhead 60. The next sequential digit signal being a binary "0," a negative pulse, applied to the digit line 54 develops a longitudinal magnetic field in the surface of the magnetic thin-film and combines with a transverse magnetic field from a current pulse on transverse field line 56 so as to maintain the magnetization vector of local area 66 in the direction representing a binary "0." The magnetization vector of local area 68 is affected in a manner identical to that as described in relation to local area 64. In this manner the sequential binary data of 101 would be stored in the same sequential relationship as received by the digit line 54. The alignment of the magnetization vectors in the local areas 64, 66 and 68 represent for descriptive purposes only, the first 3 bits received serially by the digit line 54 and as shown in item 40, FIG. 3. It is obvious that the remainder of the serialized binary signals of item 40 in FIG. 3 as well as any additional signals would be stored by magnetic representations in the same manner as described above.

For reading out the information stored in the embodiment shown in FIG. 4, current is applied to transverse field line 56 and the digit line 54 is utilized as a sense line. As the magnetic thin-film is transported past the transducer, the magnetization vectors of each of the local areas are partially rotated by the transverse magnetic field resulting in a signal being induced in the digit line 54 with the polarity of the signal representing a binary "0" or "1." A sensing circuit connected to the digit line detects the induced signals as they occur in their same serialized relationship as they had been previously stored in the thin-film. Preferably, the transverse field line current is in the form of a series of short duration pulses. As each local area containing stored information is transported past the transducer, the pulse-type transverse magnetic field rotates the magnetization vector. Since the magnetization vectors are able to respond to short duration pulses, there results a rapid change in magnetic field which induces a substantial signal in the digit line.

It is understood that suitable modifications may be made in the structure as disclosed provided such modifications come within the spirit and scope of the appended claims. Having now, therefore, fully illustrated and described my invention, what I claim to be new and desire to protect by Letters Patent is set forth in the appended claims.

What is claimed is:

1. Apparatus for storing serialized data signals, comprising: a magnetic thin-film surface characterized by an easy direction of magnetization and locally magnetically-saturable areas; a source of serialized data signals; conducting means for receiving said signals from said source and for inductively coupling a plurality of said serialized signals to said surface; and means for applying a further magnetic field to said surface in combination with the inductively coupled signals for causing each of said local areas to store a magnetic representation of a respectively different one of said signals.

2. Apparatus for storing serialized data signals, comprising: a magnetic thin-film surface characterized by an easy axis of magnetization and locally magnetically-saturable areas; a source of serialized data signals; conducting means for receiving said signals from said source and for inductively coupling to said surface a plurality of serialized data signals with the magnetic axis of said conducting means substantially parallel to said thin-film easy axis;

means for applying a magnetic field to said thin-film substantially transverse to said easy axis concurrently at least in part with said inductively coupled data signals for conditioning each of said local areas to store a magnetic representation of respective ones of said data signals.

3. Magnetic recording apparatus, comprising: a source of serialized data signals; a magnetic thin-film surface characterized by an easy axis of magnetization and locally magnetically-saturable areas; a drive line for receiving a plurality of said serialized data signals from said source inductively coupled to said thin-film with its magnetic axis substantially parallel to said thin-film easy axis, the relationship between said thin-film and said drive line being such that the inductively coupled data signals on said drive line occur as spatially-varying functions with respect to said thin-film; and means for applying a magnetic field to said thin-film transverse to said easy axis concurrently at least in part with said drive line data signals for conditioning said thin-film to store magnetic representations of each of the plurality of said data signals in different ones of said local areas.

4. Apparatus for magnetic storage of serialized signals, comprising: a source of serialized data pulse signals; conducting means having a constant velocity of propagation for receiving a plurality of serialized pulse signals from said source and for propagating them from the receiving end toward a terminating end; a magnetic thin-film surface characterized by an easy axis of magnetization, fixedly located with respect to said conducting means and inductively coupled thereto; and means for applying a further magnetic field to said surface for conditioning said surface to store simultaneously magnetic representations of all of said plurality of inductively coupled pulse signals in said serialized relationship.

5. Apparatus as in claim 4 wherein the magnetic axis of said conducting means is substantially parallel to said thin-film easy axis; and said conditioning magnetic field is substantially transverse to said easy axis.

6. Magnetic storage apparatus, comprising: a magnetic thin-film surface characterized by an easy axis of magnetization and locally magnetically-saturable areas; a source of serialized pulse signals; conducting means having a constant velocity of propagation for receiving a plurality of serialized pulse signals from said source and for propagating said signals from a receiving end toward a terminating end, said means fixedly located with respect to said surface and inductively coupled thereto with its magnetic axis substantially parallel to said easy axis whereby said plurality of signals are inductively coupled to said surface as a spatially-varying function; and means for applying a magnetic field to said surface substantially transverse to said easy axis for conditioning said local surface areas to store simultaneously magnetic representations of all of said inductively coupled pulse signals.

7. Magnetic storage apparatus for digital data, comprising: a source of serialized data pulse signals; a transmission line having a constant velocity of propagation for receiving a plurality of said serialized data pulse signals at one end and for propagating them toward a terminating end whereby said serialized signals occur as a spatially-varying function waveform having a magnetic field H-vector for each of said signals; a magnetic thin-film surface characterized by an easy axis of magnetization and locally magnetically-saturable areas inductively coupled to said transmission line with said easy axis substantially parallel to said H-vectors; means for applying a momentary magnetic field to said thin-film substantially transverse to said easy axis concurrently at least in part with said plurality of data signals, said transverse field and said H-vectors combining to store in said local areas magnetic representations of said data pulses in the same spatially-varying relationship as they occur on said transmission line.

8. Magnetic storage apparatus for digital data, comprising: a source of serialized data pulse signals; a transmission line having a constant velocity of propagation for receiving a plurality of said serialized data pulse signals at one end and for propagating them toward a terminating end whereby said serialized signals occur as a spatially-varying function waveform having a magnetic field H-vector for each of said signals; a magnetic thin-film surface characterized by contiguous locally magnetically-saturable areas, each having a magnetization vector along an easy axis of magnetization with all of said axes being parallel, inductively coupled to said transmission line with said easy axes parallel to said H-vectors; and means for applying a momentary magnetic field to said thin-film transverse to said easy axes concurrently at least in part with said plurality of data signals, said transverse field and said H-vectors combining to position the magnetization vectors of respective local areas in accordance with the corresponding data signal value whereby magnetic representations of each of said data signals are stored on said thin-film surface in said same spatially-varying relationship.

9. Apparatus for storing magnetic representations of binary data, comprising: a source of serialized binary data pulse signals; a transmission line having a constant velocity of propagation for receiving a plurality of serialized binary data pulse signals at one end and for propagating said signals toward a termination end, the polarity of each of said pulse signals representing the binary value of the corresponding binary digit, each of said data pulses generating a magnetic field H-vector having a direction corresponding to the pulse polarity; a magnetic thin-film surface characterized by contiguous locally magnetically-saturable areas, each having a rotatable magnetization vector in alignment with an easy axis with all of said easy axes being parallel, inductively coupled to said transmission line with said easy axes parallel to said H-vectors; and means for applying a momentary magnetic field to said thin-film surface transverse to said easy axes concurrently at least in part with said plurality of data signal H-vectors, said transverse field combining with said H-vectors to rotate the magnetization vectors of the respective inductively coupled local areas to a first position when said H-vector is of a first direction and a second position when said H-vector is of a second direction.

10. Apparatus for storing magnetic representations of binary data comprising: a magnetic thin-film surface characterized by contiguous locally magnetically-saturable areas, each having a rotatable magnetization vector in alignment with an easy axis thereof, the direction of said magnetization vector along said easy axis providing a magnetic representation of a binary digit, all of said easy axes being parallel to one another; a source of serialized binary data pulse signals, the polarity of each of said pulse signals representing the value of the corresponding binary digit; a transmission line having a constant velocity of propagation for receiving a plurality of said serialized binary data pulse signals, and each of said pulse signals generating a magnetic field H-vector in a direction corresponding to the pulse polarity, and for coupling said H-vectors as longitudinal field to respective ones of said local areas; means for applying a momentary transverse magnetic field to said local areas concurrently at least in part with said plural H-vectors whereby said transverse field combines with said longitudinal fields to rotate the magnetization vectors of the respective local areas to a direction along said easy axes corresponding to the binary value of said data signals.

11. Apparatus for storing magnetic representations of binary data, comprising: a source of serialized binary data pulse signals, the polarity of each of said pulse signals representing the binary value of a corresponding binary digit; conducting means exhibiting transmission line characteristics with a constant velocity of propagation for receiving a plurality of said serialized binary data pulse signals at one end and for propagating said signals toward a termination end, each of said data pulses as they occur on said conducting means generating a magnetic field H-vector directed outwardly from said conducting means in a direction corresponding to the polarity of the respective pulses; a magnetic thin-film surface characterized by a plurality of contiguous locally magnetically-saturable areas, each of said areas characterized by a magnetization vector settable to either of two stable directions along an easy axis with all of said easy axes being parallel, said surface inductively coupled to said conducting means with said easy axes substantially parallel to said H-vectors; and means for applying a momentary magnetic field to said thin-film surface transverse to said easy axes concurrently at least in part with said plurality of data signal H-vectors for combining with said H-vectors to set the magnetization vectors of the respective local areas to a first stable direction if the corresponding H-vector is in a first direction and to the second stable direction when the corresponding H-vector is in a second direction.

12. A magnetic storage device including a thin-ferromagnetic film of ribbon form exhibiting uniaxial anisotropy such that it has a preferred axis of remanent magnetization aligned along the width dimension, characterized by a plurality of contiguous discrete magnetically saturable areas along the length dimension, each of said discrete areas including a magnetization vector selectively settable to stable states in opposite directions substantially parallel to said preferred axis, and conducting means having a predetermined velocity of propagation and in an operative relationship with said film for receiving signals at one end and for propagating said signals toward a termination end.

13. The device of claim 12 further including means for selectively setting the magnetization vector of each of the discrete areas to one of the stable directions.

14. A device of claim 13 wherein said latter means comprises said conducting means inductively coupled to said thin-film with its magnetic axis substantially parallel to said preferred axis and further conducting means inductively coupled to said thin-film arranged substantially transverse to said first conducting means.

15. A magnetic storage device, including: a thin ferromagnetic film in ribbon form exhibiting uniaxial anisotropy characterized by a plurality of independently magnetically saturable areas substantially contiguous along the length of said film; each of said areas having an easy axis of magnetization along the width dimension of said film; a pair of intersecting insulatively-spaced conducting means inductively coupled at said intersection to said film, one of said conducting means having its magnetic axis substantially parallel to said easy axes, the other having its magnetic axis substantially transverse to said easy axes; said film adaptable for motion in the length dimension such that each of said areas in turn can be inductively coupled to said intersection.

16. A magnetic storage device including: a thin ferromagnetic film in ribbon form exhibiting uniaxial anisotropy characterized by a plurality of independent magnetically saturable areas substantially contiguous along the length of said film; each of said areas having an easy axis of magnetization along the width dimension of said film and a magnetization vector selectively settable to two stable conditions in opposite directions along said easy axis; first conducting means for receiving digital data signals inductively coupled to said film with its magnetic axis substantially parallel to said easy axes; second conducting means intersecting said first conducting means but electrically insulated therefrom with its magnetic axis substantially transverse to said easy axes for applying a transverse magnetic field to said film; said film adaptable for motion with respect to the intersection of said conducting means along the length dimension such that each of said independent film areas can be inductively coupled to said intersection.

References Cited by the Examiner

UNITED STATES PATENTS

| | | | |
|---|---|---|---|
| 2,919,432 | 12/1959 | Broadbent | 340—174 |
| 3,030,612 | 4/1962 | Rubens et al. | 340—174 |
| 3,165,722 | 1/1965 | Ghisler | 340—174 |
| 3,209,333 | 9/1965 | Russell | 340—174 |
| 3,212,070 | 10/1965 | Fuller et al. | 340—174 |

References Cited by the Applicant

UNITED STATES PATENTS 3,130,390 4/1964 Moore et al.

BERNARD KONICK, *Primary Examiner.*

IRVING SRAGOW, *Examiner.*

H. D. VOLK, R. R. HUBBARD, J. MOFFITT, *Assistant Examiners.*

UNITED STATES PATENT OFFICE

CERTIFICATE OF CORRECTION

Patent No. 3,284,783 November 8, 1966

William W. Davis

It is hereby certified that error appears in the above numbered patent requiring correction and that the said Letters Patent should read as corrected below.

Column 2, line 32, for "other end" read -- other and --; column 3, line 59, for "the" read -- this --; line 71, for "on" read -- an --; column 11, line 44, for "plurality of serialized" read -- plurality of said serialized --.

Signed and sealed this 12th day of September 1967.

(SEAL)
Attest:

ERNEST W. SWIDER
Attesting Officer

EDWARD J. BRENNER
Commissioner of Patents